United States Patent
Calo et al.

(10) Patent No.: US 10,897,407 B2
(45) Date of Patent: *Jan. 19, 2021

(54) MECHANISM FOR FAULT DIAGNOSIS AND RECOVERY OF NETWORK SERVICE CHAINS

(71) Applicant: INTERNATIONAL BUSINESS MACHINES CORPORATION, Armonk, NY (US)

(72) Inventors: Seraphin B. Calo, Cortlandt Manor, NY (US); Douglas M. Freimuth, New York, NY (US); Thai Franck Le, White Plains, NY (US); Christian Makaya, Summit, NJ (US); Erich Nahum, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,209

(22) Filed: Oct. 25, 2019

(65) Prior Publication Data
US 2020/0059418 A1 Feb. 20, 2020

Related U.S. Application Data

(63) Continuation of application No. 15/619,067, filed on Jun. 9, 2017, now Pat. No. 10,536,347.

(51) Int. Cl.
*H04L 12/24* (2006.01)
*H04L 29/08* (2006.01)
*G06F 9/455* (2018.01)

(52) U.S. Cl.
CPC ...... *H04L 41/5035* (2013.01); *G06F 9/45558* (2013.01); *H04L 41/065* (2013.01);
(Continued)

(58) Field of Classification Search
CPC . H04L 41/12; H04L 41/5025; H04L 41/5035; H04L 41/5058; H04L 67/36
See application file for complete search history.

(56) References Cited

U.S. PATENT DOCUMENTS 8,782,662 B2 7/2014 Bobak
8,826,077 B2 9/2014 Bobak et al.
(Continued)

OTHER PUBLICATIONS

List of IBM Patents or Patent Applications Treated as Related dated Oct. 25, 2019, 2 pages.

(Continued)

*Primary Examiner* — Chris Parry
*Assistant Examiner* — Adam A Cooney
(74) *Attorney, Agent, or Firm* — Tutunjian & Bitetto, P.C.; Vazken Alexanian

(57) ABSTRACT

A computer-implemented method is provided for fault diagnostics and recovery of network service chains. The method includes identifying, by a processor, intersecting ones of components of the network service chains in a network graph indicative of a commonality therebetween. The network graph represents the components of the network service chains. The method further includes selectively repairing, by the processor, one or more of the components of at least one of the network service chains up to an entirety thereof based on a component repair sequence that maintains service continuity of the network service chains and that is determined and selectively reordered based on the commonality. The network graph includes a plurality of graphs, each (i) including one or more Virtualized Network Functions, and (ii) corresponding to a respective one of the network service chains.

14 Claims, 8 Drawing Sheets

(52) U.S. Cl.
CPC .......... *H04L 41/0636* (2013.01); *H04L 41/12* (2013.01); *H04L 41/16* (2013.01); *H04L 41/5025* (2013.01); *H04L 41/5058* (2013.01); *H04L 67/36* (2013.01); *G06F 2009/45595* (2013.01)

(56) References Cited

U.S. PATENT DOCUMENTS

| | | | |
|---|---|---|---|
| 2009/0171730 A1 | 7/2009 | Bobak et al. | |
| 2015/0227404 A1* | 8/2015 | Rajagopal | G06F 11/0784 714/37 |
| 2016/0246652 A1* | 8/2016 | Herdrich | G06F 9/5077 |
| 2016/0261474 A1 | 9/2016 | Raghavan et al. | |
| 2016/0380831 A1* | 12/2016 | Shevenell | H04L 41/0816 370/254 |
| 2017/0078216 A1* | 3/2017 | Adolph | G06F 9/45558 |
| 2019/0149508 A1* | 5/2019 | Silvestro | H04L 45/306 709/238 |

OTHER PUBLICATIONS

Bhalla, et al., "Magic Quadrant for Network Performance Monitoring and Diagnostics", Gartner, Feb. 2015, pp. 1-17.

ETSI, "Network Functions Virtualisation (NFV); Reliability; Report on Models and Features for End-to-End Reliability Disclaimer", Group Specification, Apr. 2016, 105 pages.

IBM, "Method and Apparatus for Automatically Configuration Problem Diagnosis and Recovery Based on Change Trace Checking and Rollback", IP.com Prior Art Database Technical Disclosure, Oct. 2007, 6 pages.

IBM, "System and Method for Using Component Refurbishment Status in Isolation, Repair, and Failure Analysis", An IP.com Prior Art Database Technical Disclosure, Aug. 2005, 4 pages.

IBM, "Automated Failure Detection, Diagnosis and Repair Mechanism for on Demand Autonomic Self-healing Systems", IP.com Prior Art Database Technical Disclosure, Mar. 2004, 7 pages.

\* cited by examiner

MECHANISM FOR FAULT DIAGNOSIS AND RECOVERY OF NETWORK SERVICE CHAINS

BACKGROUND

Technical Field

The present invention relates generally to fault detection and, in particular, to a mechanism for fault diagnosis and recovery of network service chains.

Description of the Related Art

There is a movement towards hardware based appliances being virtualized as software appliances for telco and enterprise IT applications. Traditionally, network functions are deployed in dedicated appliances and hardware. In this context, fault management (e.g., failure or performance degradation) and service assurance are performed by isolating each appliance and performing analysis and recovery. In fact, there is a direct correlation between fault/failure and the appliance features. However, the fault diagnostic and recovery processes are not considered for the service chain, which is defined as a set of network functions and links connected together.

With the softwarization of network appliances and functions, the performance of an end-to-end network service is affected by different entities and resources (e.g., hypervisors, virtual links, disk usage, CPU, memory, policy, negative impact of one network function to another network function hosted on the same compute node, dynamicity of the virtualized environment, and so forth). In fact, there is no strict correlation between fault/failure or performance degradation and appliance features for virtualized network functions (VNFs), making it difficult to pin point the root cause of faults and track down any relevant issues.

An end-to-end network service is composed of VNF and virtual link (VL) instances connected together. The virtualized environment is highly dynamic, since the virtualized components can be added or removed, migrated, scaled, reconfigured, updated, integrated with third party network functions, and so forth, making fault diagnostics of network functions and service chains a complex task. Hence, there is a need for automated service chain fault diagnostic and recovery based on network function context to detect faults and performance degradation in order to guarantee service continuity (e.g., reliability and availability).

SUMMARY

According to an aspect of the present invention, a computer-implemented method is provided for fault diagnostics and recovery of network service chains. The method includes identifying, by a processor, intersecting ones of components of the network service chains in a network graph indicative of a commonality therebetween. The network graph represents the components of the network service chains. The method further includes selectively repairing, by the processor, one or more of the components of at least one of the network service chains up to an entirety thereof based on a component repair sequence that maintains service continuity of the network service chains and that is determined and selectively reordered based on the commonality. The network graph includes a plurality of graphs, each (i) including one or more Virtualized Network Functions, and (ii) corresponding to a respective one of the network service chains.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a mechanism for fault diagnosis and recovery of network service chains.

In an embodiment, the present invention can provide network service chain fault management at the (virtual) infrastructure layer as well as the application layer.

A network service is a composition of network functions (e.g., Virtual Network Functions (VNFs) that is defined by its functional and deployment specification. The network service can be managed as a graph which includes precedence and dependence relationships. The graph can be referred to as a network service chain (also referred to as a Forwarding Graph (FG)).

In an embodiment, a network service chain (or "service chain" in short) can be represented as a set of virtual objects (VNFs) with attributes and relationships connected in a graph. Application level policies for fault diagnosis are set using the attributes and relationships in the graph. Recovery actions are taken based on evaluation of the policies and monitoring status of the virtual objects (e.g., VNFs, Virtual Links (VLs), etc.).

Hence, instead of an algorithm to pinpoint the exact point of failure inside of a failing component(s), the present invention identifies and replaces 1 to N whole components that have a failing element, where N is a replacement of the entire service. A set of collective components (service chain) is recovered rather than an individual appliance. The impacted service chain is identified and recovered and the availability and reliability of an end-to-end network service is guaranteed by leveraging network service context-awareness, service chain commonality, and network graph discovery.

The network graph is derived by discovering the topology of the network service chains and identifying common components of the service chains. This commonality is used to reorder in which sequence the service chain component(s) are recovered. The behavior of the virtualized network functions and virtual links, which compose a network service is monitored to determine the failing common component(s). Once the failed common component has been identified and repaired, the impacted service chains are recovered based on a defined order. The network graph topology information is then updated. In an embodiment, policies are provided that describe service chain component recovery times so that 1 to N virtual objects can be prebuilt based on deterministic values.

Figure 1:
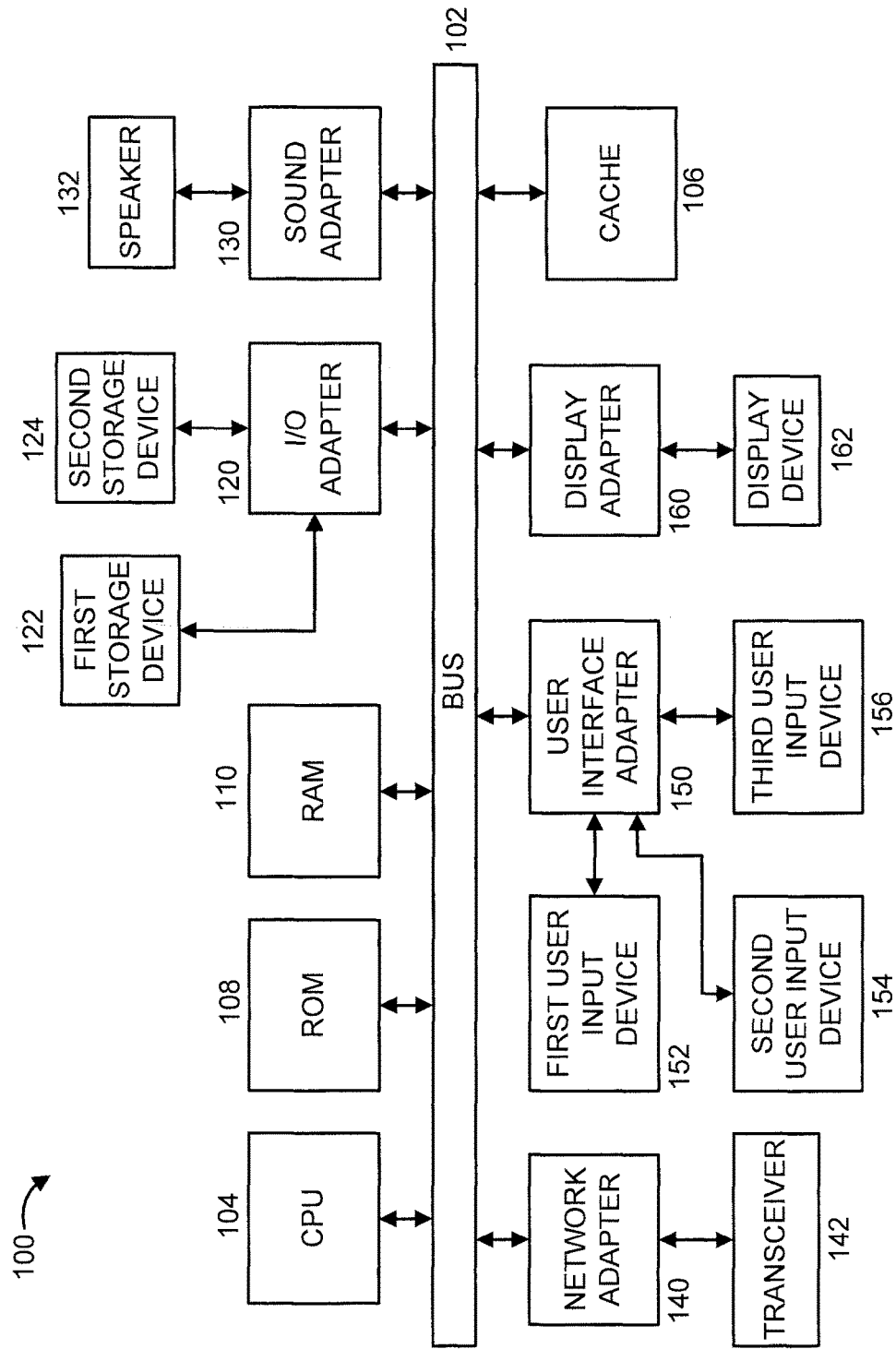
FIG. 1 shows an exemplary processing system to which the present invention can be applied, in accordance with an embodiment of the present invention.

FIG. 1 shows an exemplary processing system 100 to which the present invention can be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
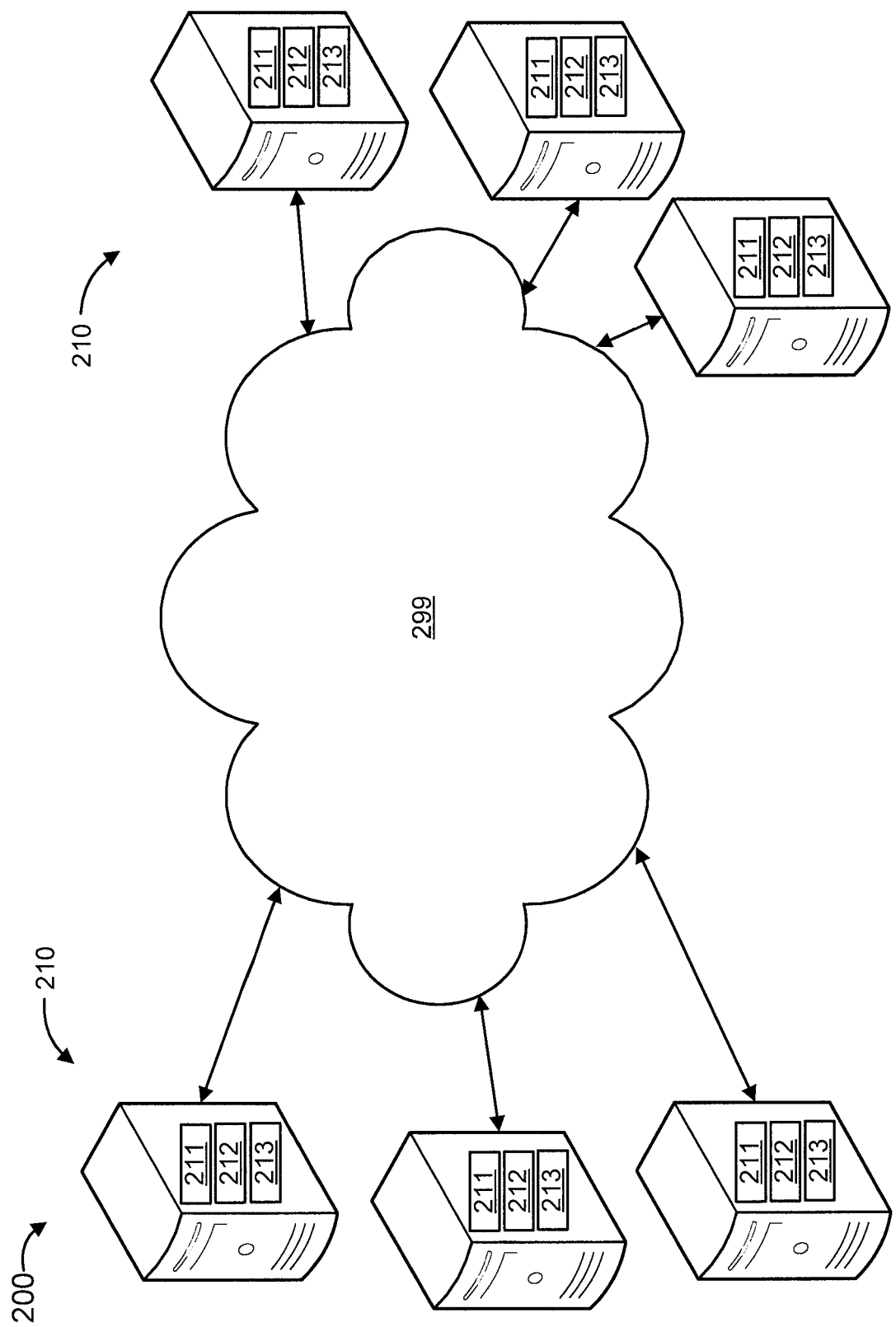
FIG. 2 shows an exemplary network environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 4:
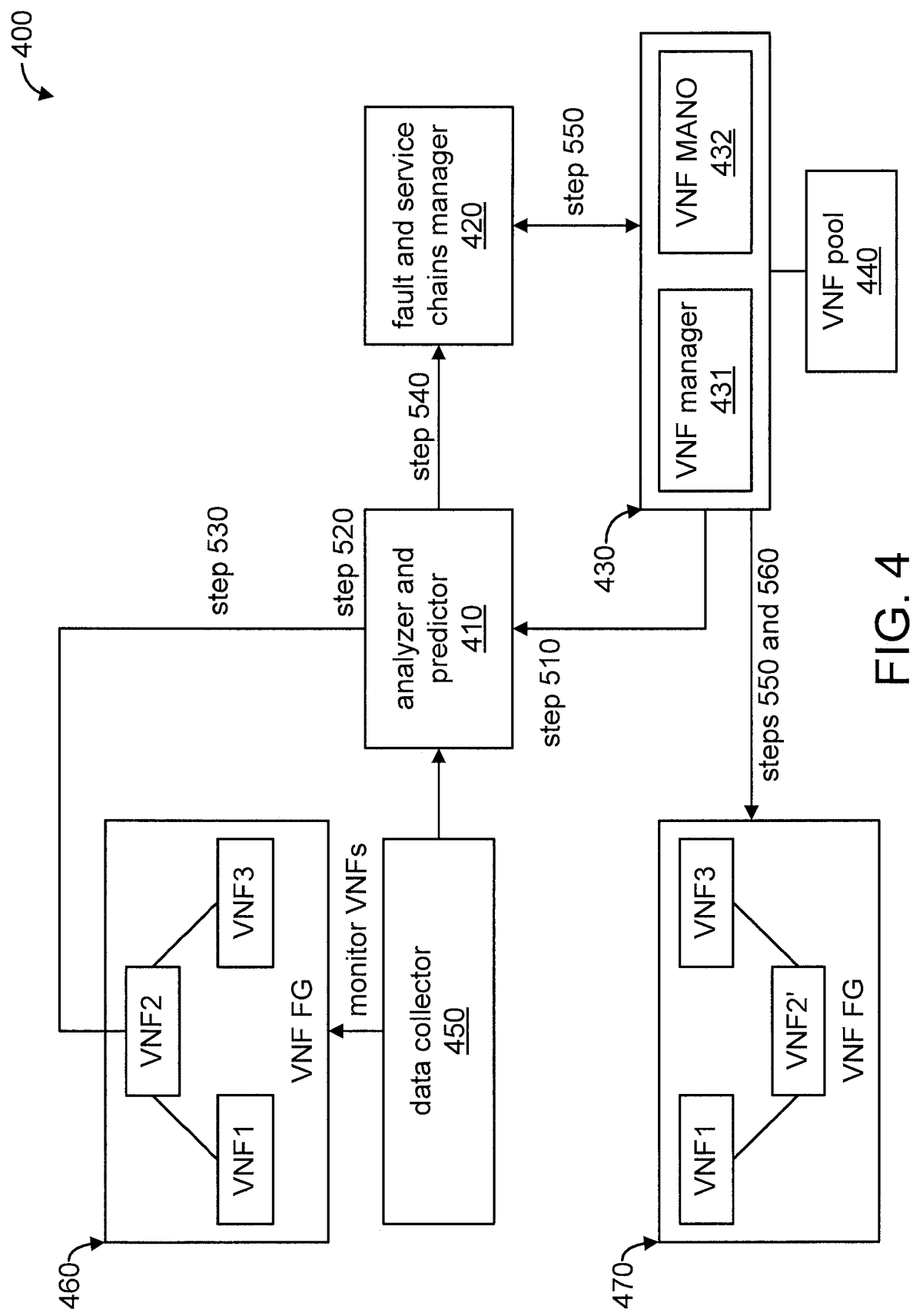
FIG. 4 shows an exemplary system for fault diagnosis and recovery of network service chains, in accordance with an embodiment of the present invention.

Also, it is to be appreciated that system 400 described below with respect to FIG. 4 is a system for implementing respective embodiments of the present invention. Part or all of processing system may be implemented in one or more of the elements of system 400.

Figure 7:
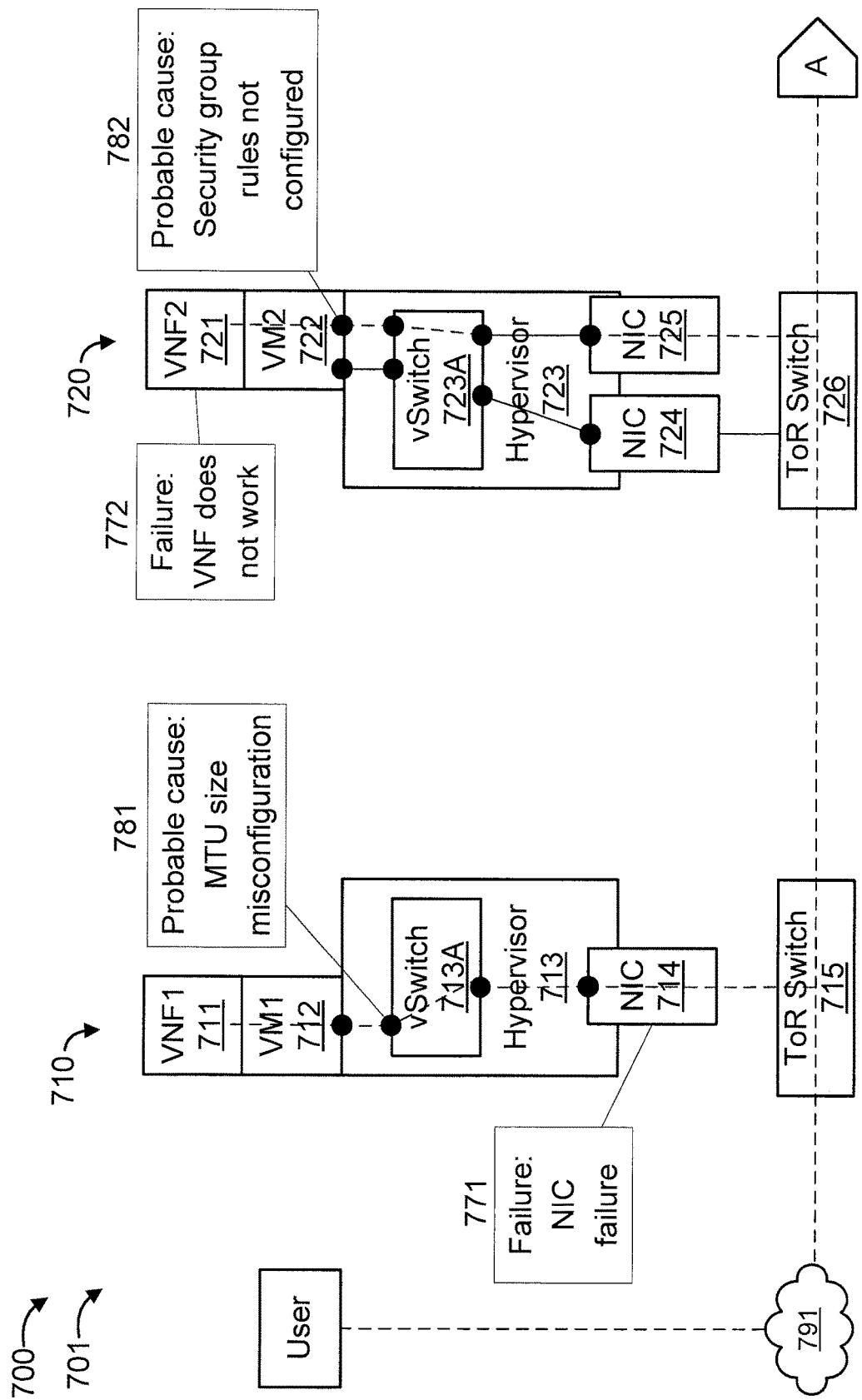
FIGS. 7-8 show another exemplary environment to which the present invention can be applied, in accordance with an embodiment of the present invention.
Figure 8:
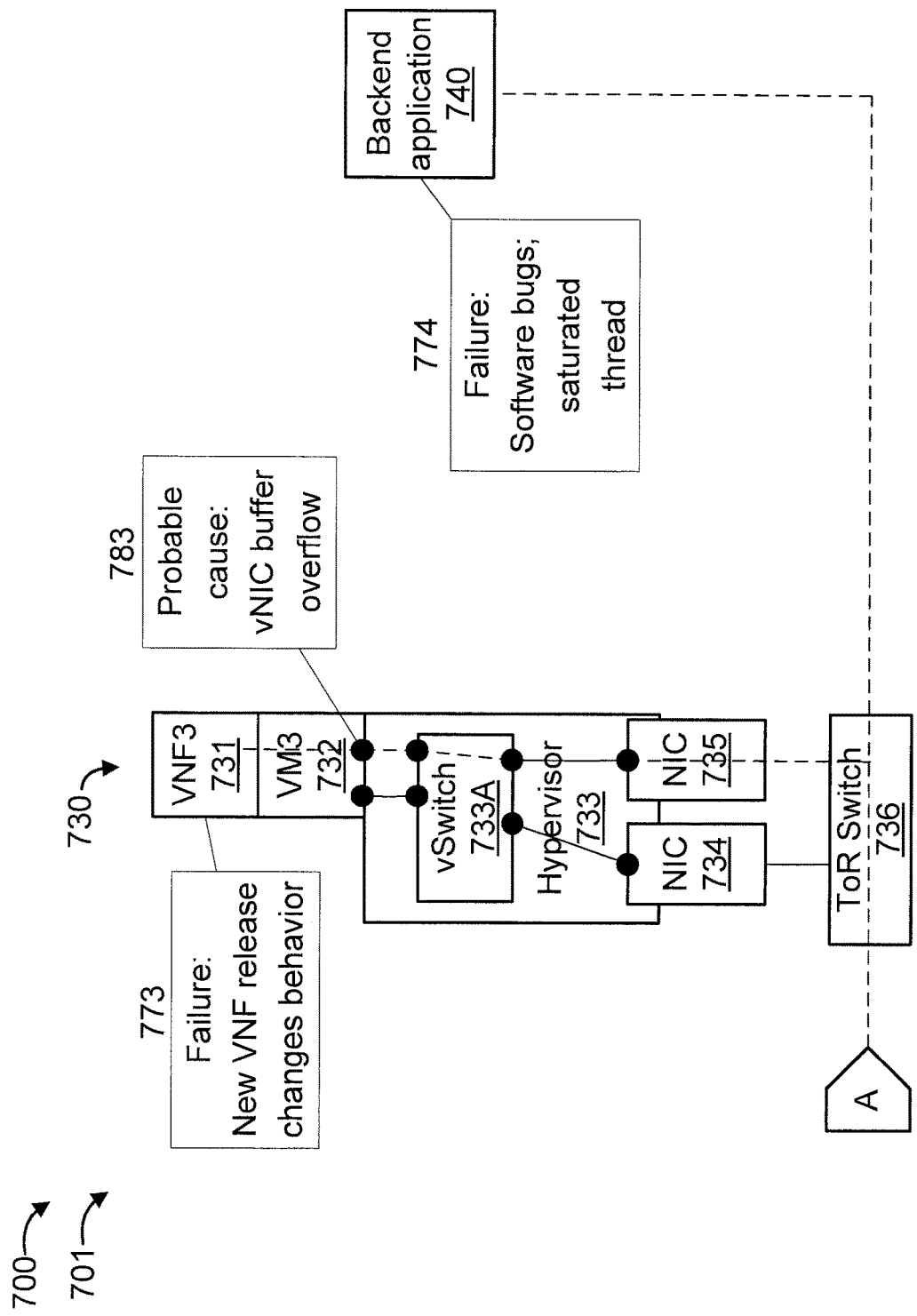

Additionally, it is to be appreciated that environment 700 described below with respect to FIGS. 7-8 is an environment for implementing respective embodiments of the present invention. Part or all of processing system 100 may be implemented in one or more of the elements of environment 700.

Figure 5:
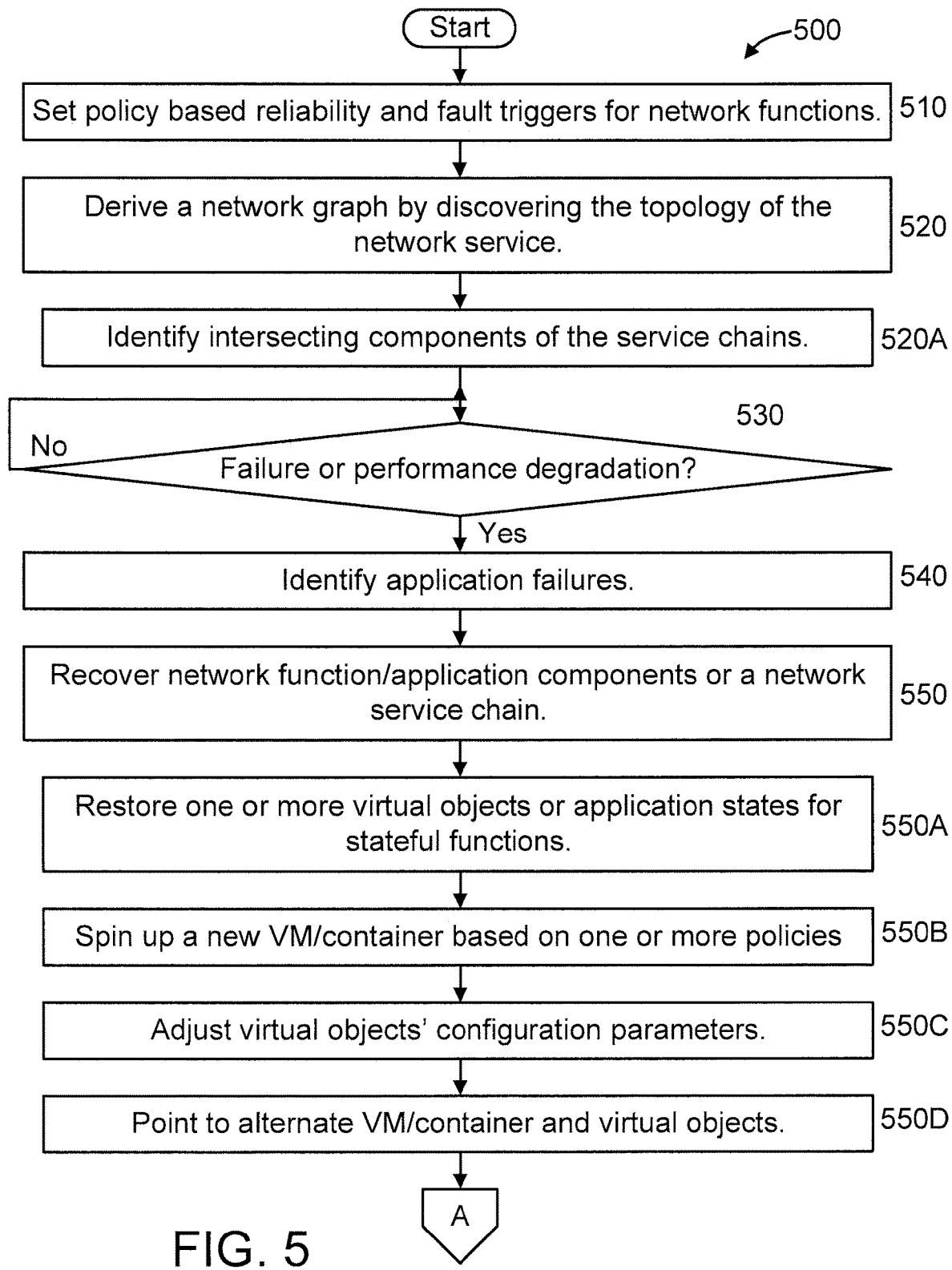
FIGS. 5-6 show an exemplary method for fault diagnosis and recovery of network service chains, in accordance with an embodiment of the present invention.
Figure 6:
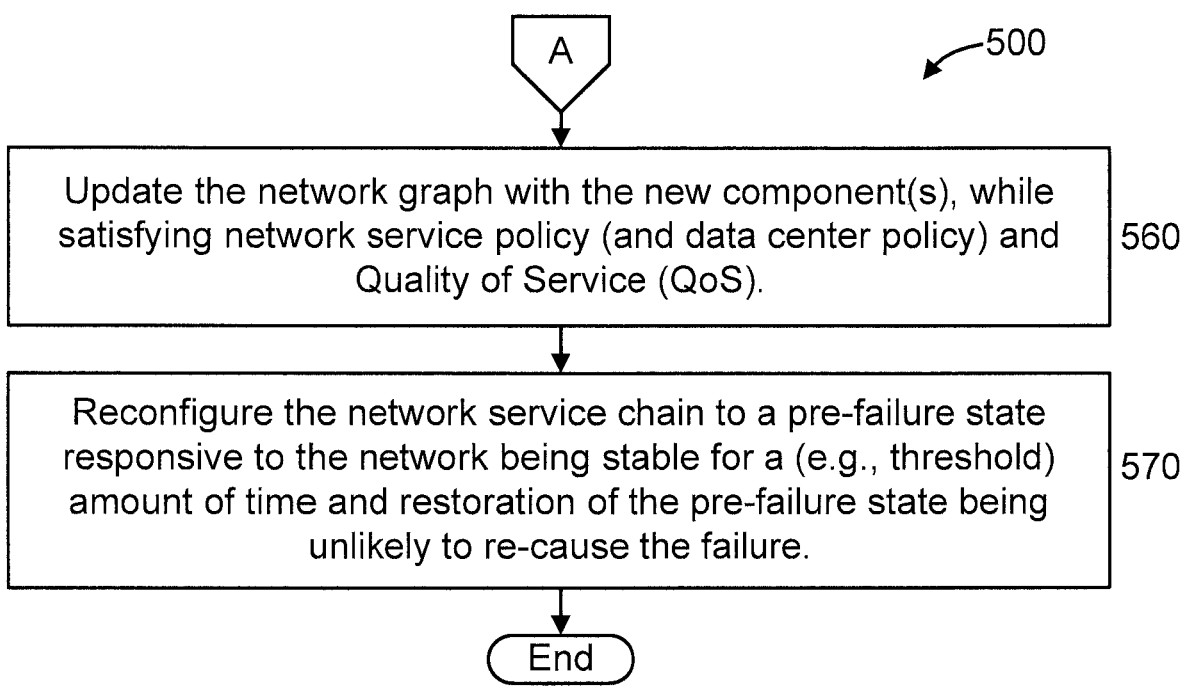

Further, it is to be appreciated that processing system 100 may perform at least part of the method described herein including, for example, at least part of method 500 of FIGS. 5-6. Similarly, part or all of environment 200 may be used to perform at least part of method 500 of FIGS. 5-6. Additionally, part or all of system 400 may be used to perform at least part of method 500 of FIGS. 5-6. Also, part or all of environment 700 may be used to perform at least part of method 500 of FIGS. 5-6.

FIG. 2 shows an exemplary network environment 200 to which the present invention can be applied, in accordance with an embodiment of the present invention.

The environment 200 includes a set of processing nodes 210. In an embodiment, the set of nodes 210 are part of a distributed data processing system.

Each of the processing nodes 210 at least includes a processor 211 and a memory 212 for performing one or more functions. Moreover, the environment 200 includes a set of network service chains, collectively and singularly denoted by the figure reference numeral 213. Each of the processing nodes 210 includes at least part (up to all) of at least one network service chain 213.

In the embodiment shown in FIG. 2, the elements thereof are interconnected wirelessly over one or more networks (collectively and singularly denoted by the figure reference numeral 299). However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

Figure 3:
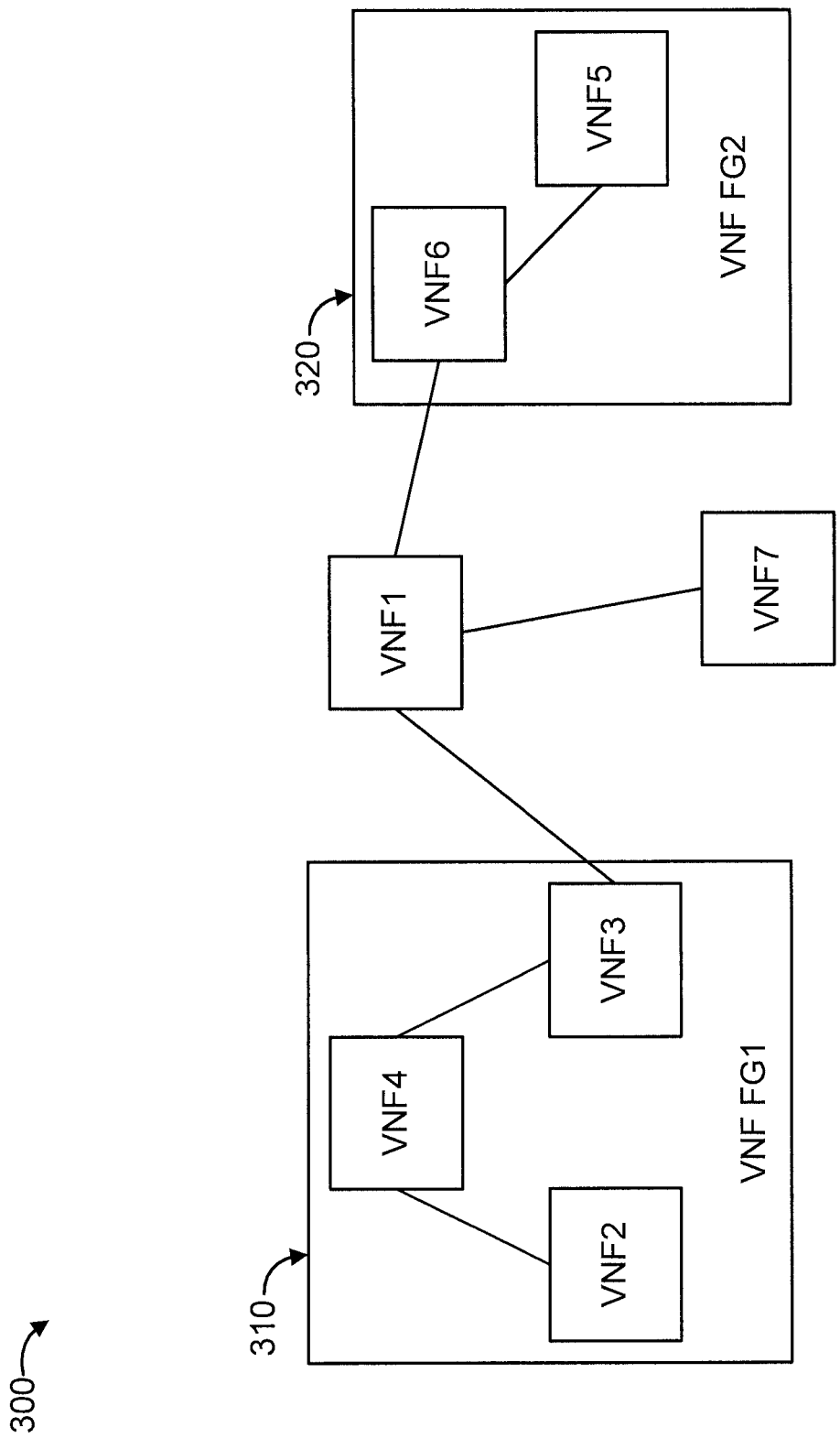
FIG. 3 shows an exemplary graph of service chains to which the present invention can be applied, in accordance with an embodiment of the present invention.

FIG. 3 shows an exemplary graph 300 of service chains to which the present invention can be applied, in accordance with an embodiment of the present invention.

The graph 300 includes a Virtualized Network Function (VNF) Forwarding Graph 1 (FG1) 310, a VNF FG2 320, a VNF1, and a VNF7. The VNF FG1 310 includes a VNF2, a VNF 3, and a VNF4. The VNF FG2 320 includes a VNF5 and a VNF6. Each of the VNF FGs 310 and 320 can be considered as a respective service chain.

In graph 300, VNF1 is the common component to the different service chains. Upon failure of VNF1, we identify the impacted service chains and determine in which order they should be recovered. Upon failure of VNF1, commonality is used to reorder in which sequence the service chain components are to be repaired while guaranteeing service continuity.

It is to be appreciated that prior art fault management approaches do not address the commonality and are specific to each (physical/virtual) appliance. Each appliance or network function is recovered individually, which may induce performance degradation for the entire end-to-end network service or other network services sharing a common VNF. In contrast, the present invention considers fault diagnostic and recovery for a service chain rather than simply for an individual appliance.

FIG. 4 shows an exemplary system 400 for fault diagnosis and recovery of network service chains, in accordance with an embodiment of the present invention. FIGS. 5-6 show an exemplary method 500 for fault diagnosis and recovery of network service chains, in accordance with an embodiment of the present invention. It is to be appreciated that where applicable, reference numerals for some of the steps of method 500 are also shown in FIG. 4.

Referring to FIG. 4, the system 400 utilizes real-time monitoring and (predictive) analytics for providing insights from VNF and VL instances for end-to-end network service orchestration in order to predict and diagnose faults.

The system 400 includes an analyzer and predictor 410, a fault and service chains manager 420, a managing entity 430, a VNF pool 440, a data collector 450, a current service chain 460, and a new service chain 470.

The managing entity 430 includes a VNF manager 431 and a VNF MANO (Management and Orchestration) element 432.

The data collector 450 can collect data from logs and/or by using a monitoring agent in the network functions to monitor Virtual Links (VLs).

The analyzer and predictor 410 receives the collected data from the data collector. The analyzer and predictor 410 processes and analyses the data to determine potential failures.

The analyzer and predictor 410 can use various approaches from analytics and statistics including, but not limited to, machine learning and heuristics, in order to correlate service requirements and resources.

The faults and service chains manager 420 maintains the network service graph topology and the sequence order of network service chains based on the commonality of component(s) and end-to-end network service requirements.

Referring to FIGS. 5-6, at step 510, set policy based reliability and fault triggers for network functions.

At step 520, derive a network graph by discovering the topology of the network service.

In an embodiment, step 520 includes step 520A.

At step 520A, identify intersecting components of the service chains. An intersecting component is a component that is common to two or more of the service chains. Thus, referring to graph 300 of FIG. 3 as an example, the intersecting component is VNF1.

At step 530, determine whether there is a failure or performance degradation. Step 530 is performed by monitoring virtual objects (e.g., network functions, virtual links, applications, and so forth). If so, then proceed to step 540. Otherwise, return to step 530. The fault can pertain, but is not limited to, for example, physical and virtual resources, VM, application levels, CPU failure, memory failure, NIC failure (e.g., connectivity lost from a network card), disk crash, guest OS crash (e.g., kernel panic, etc.), vSwitch failure, and so forth. The performance degradation can pertain, but is not limited to, application and infrastructure Key Performance Indicators (KPIs), latency (average, highest, lowest, etc.), jitter, throughput, packet loss at the segment or end-to-end level, CPU usage, memory usage, disk usage, availability, jitter of (e.g., Session Initiation Protocol (SIP)) requests, rejected (e.g., SIP) requests, energy consumption, request queue size (average, highest, lowest, etc.), MOS (Mean Opinion Score), and so forth.

At step 540, identify application failures, for example, based on any failures and/or performance degradation determined at step 530.

At step 550, recover network function/application components or a network service chain.

In an embodiment, step 550 includes one or more of steps 550A, 550B, 550C, and 550D.

At step 550A, restore one or more virtual objects or application states for stateful functions.

At step 550B, spin up a new VM/container based on one or more policies (e.g., use a hot stand-by if the involved application is sensitive to packet loss).

At step 550C, adjust virtual objects' configuration parameters.

At step 550D, point to alternate VM/container and virtual objects.

At step 560, update the network graph with the new component(s), while satisfying network service policy (and data center policy) and Quality of Service (QoS).

At step 570, reconfigure the network service chain to a pre-failure state responsive to the network being stable for a (e.g., threshold) amount of time and restoration of the pre-failure state being unlikely to re-cause the failure. In an embodiment, the latter condition (restoration of the pre-failure state being unlikely to re-cause the failure) can be determined based on, for example, historical data compared to current monitored data, and so forth, as readily appreciated by one of ordinary skill in the art given the teachings of the present invention provided herein, while maintaining the spirit of the present invention.

Hence, in an embodiment, characteristics of the application to which the present invention can be applied include, but are not limited to, the following: application level KPIs; virtual resources (e.g., CPU, memory, Input/Output (I/O), and so forth); Virtual Link (VL) usage (e.g., bandwidth, latency, jitter, packet loss, and so forth); topological locations of VNF/VL instances; and so forth.

Moreover, in an embodiment, performance metrics to which the present invention can be applied include, but are not limited to, the following: availability of VNF or VL; CPU and/or memory utilization of a VNF instance; disk usage of a VNF instance; throughput of a VNF instance; energy consumption of a VNF instance; bandwidth of a VL instance; latency of a VL instance; packet loss of a VL instance; jitter of a VL instance; and so forth.

FIGS. 7-8 show another exemplary environment 700 to which the present invention can be applied, in accordance with an embodiment of the present invention.

The environment 700 includes a set of nodes 701. The set of nodes 701 includes nodes 710, 720, and 730. The environment 700 further includes a backend application 740.

Node 710 includes VNF1 711, VM1 712, a Hypervisor 713 having a vSwitch 713A, a Network Interface Card (NIC) 714, and a Top of Rack (ToR) switch 715.

Node 720 includes VNF2 721, VM2 722, a Hypervisor 723 having a vSwitch 723A, a NIC 724, a NIC 725, and a ToR switch 726.

Node 730 includes a VNF3 731, a VM3 732, a Hypervisor 733 having a vSwitch 733A, a NIC 734, a NIC 735, and a ToR switch 736.

A user 799 sends requests over the Internet 791 (or other network(s)) to the nodes 701 and/or the backend application 740.

Various failures and failure causes are shown. For example, regarding node 710, a NIC failure 771 is probably caused by a MTU size misconfiguration 781. Regarding node 720, a VNF failure 772 is probably caused by security group rules not being configured 782. Regarding node 730, a new VNF release changing behavior 773 is probably caused by a vNIC buffer overflow 783. Regarding backend application 740, potential failures can include software bugs and saturated threads 774.

Thus, in an embodiment, the present invention can involve monitoring, in near real-time, the performance and behavior of the infrastructure (e.g., VM, Container, VNF (e.g., FW, DPI)) and application (e.g., DB, Application Server, etc.) layers. Moreover, in an embodiment, the present invention can identify the exact cause and source of the failure, and correlated failures. Also, in an embodiment, the present invention can maintain a network graph (topology) and control the VNF dependencies. Additionally, in an embodiment, the present invention can define the policies for events and alarms. Further, in an embodiment, the present invention can perform a cross-layers mapping of failures and their correlation. Also, in an embodiment, the present invention can use the machine learning capability of operations analytics, to continuously learn, anticipate, and adjust the appropriate threshold across monitored resources and applications The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for fault diagnostics and recovery of network service chains, comprising:
   identifying, by a processor, intersecting ones of components of the network service chains in a network graph indicative of a commonality therebetween, the network graph representing the components of the network service chains; and
   selectively repairing, by the processor, one or more of the components of at least one of the network service chains up to an entirety thereof based on a component repair sequence that maintains service continuity of the network service chains and that is determined and selectively reordered based on the commonality,
   wherein the network graph comprises a plurality of graphs, each (i) comprising one or more Virtualized Network Functions, and (ii) corresponding to a respective one of the network service chains.

2. The computer-implemented method of claim 1, further comprising controlling Virtual Network Function dependencies of Virtual Network Functions in the network graph.

3. The computer-implement method of claim 1, further comprising identifying a failure in the network service chains by monitoring a status of the components of the network service chains.

4. The computer-implemented method of claim 3, wherein the failure is identified based on one or more metrics selected from the group consisting of a Key Performance Indicator, a latency, a jitter, a throughput, a packet loss, a component usage, a component availability, a component size, and an energy consumption.

5. The computer-implemented method of claim 3, wherein the failure is identified based on one or more failure types selected from the group consisting of a physical resource failure, a virtual resource failure, a Virtual Machine failure, an application level failure, a processor failure, a memory failure, a Network Interface Card failure, a disk crash, and an operating system crash.

6. The computer-implemented method of claim 1, wherein the component repair sequence is determined further based on one or more application requirements of an application relating to the at least one of the network service chains.

7. The computer-implemented method of claim 1, wherein the component repair sequence is determined further based on end-to-end network service requirements.

8. The computer-implemented method of claim 1, wherein said repairing step comprises performing a repair action selected from the group consisting of instantiating a new Virtual Machine based on one or more policies, restoring one or more network functions, adjusting one or more network function configuration parameters, adjusting one or more network function links, and pointing one or more of the components to one or more alternate ones of the intersecting components.

9. The computer-implemented method of claim 1, further comprising updating the network graph based on any repair actions performed in said repairing step.

10. The computer-implemented method of claim 1, wherein said repairing step determines a particular repair operation to perform from a set of potential repair operations based on one or more predetermined policies for the network service chains.

11. The computer-implemented method of claim 1, wherein the commonality comprises at least one of the intersecting ones of the components of the network service chains in the network graph.

12. The computer-implemented method of claim 1, wherein the at least one of the network service chains comprises N components, wherein N is an integer greater than two, and wherein said repairing step selectively replaces 1 up to N of the N components depending upon an identified failure.

13. The computer-implemented method of claim 1, further comprising correlating network service chain requirements for all of the network service chains to network resources to determine the component repair sequence of the at least one of the network service chains.

14. The computer-implemented method of claim 13, wherein said correlating step uses machine learning and heuristics to determine the component repair sequence of the at least one of the network service chains.

* * * * *

UNITED STATES PATENT AND TRADEMARK OFFICE
CERTIFICATE OF CORRECTION

PATENT NO. : 10,897,407 B2
APPLICATION NO. : 16/664209
DATED : January 19, 2021
INVENTOR(S) : Seraphin B. Calo et al.

It is certified that error appears in the above-identified patent and that said Letters Patent is hereby corrected as shown below:

On the Title Page

Item (72) Inventors: DELETE "Thai Franck Le" and INSERT --Franck Vinh Le.--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*